United States Patent [19]
Lee

[11] Patent Number: 5,997,251
[45] Date of Patent: Dec. 7, 1999

[54] RIBBED TURBINE BLADE TIP

[75] Inventor: Ching-Pang Lee, Cincinnati, Ohio

[73] Assignee: General Electric Company, Cincinnati, Ohio

[21] Appl. No.: 08/971,908

[22] Filed: Nov. 17, 1997

[51] Int. Cl.[6] .................................................. F01D 3/02
[52] U.S. Cl. ........................................................ 416/97 R
[58] Field of Search ..................................... 416/97 R, 95, 416/96 R; 415/173.1, 173.5, 173.6

[56] References Cited

U.S. PATENT DOCUMENTS

| | | |
|---|---|---|
| 1,313,152 | 8/1919 | Yarrow . |
| 1,317,707 | 10/1919 | Johnson . |
| 1,520,830 | 12/1924 | Ljungstrom . |
| 2,045,918 | 6/1936 | Moody . |
| 2,459,850 | 1/1949 | Stine . |
| 4,247,254 | 1/1981 | Zelahy . |
| 4,466,772 | 8/1984 | Okapuu et al. ................. 415/173.5 |
| 4,540,339 | 9/1985 | Horvath . |
| 4,682,933 | 7/1987 | Wagner .......................... 415/173.5 |
| 4,875,831 | 10/1989 | Fetiveau . |
| 5,476,364 | 12/1995 | Kildea ................................. 416/95 |
| 5,503,527 | 4/1996 | Lee et al. ...................... 416/97 R X |
| 5,511,946 | 4/1996 | Lee et al. . |
| 5,591,007 | 1/1997 | Lee et al. . |
| 5,660,523 | 8/1997 | Lee . |
| 5,660,524 | 8/1997 | Lee et al. . |
| 5,733,102 | 3/1998 | Lee et al. ........................... 416/97 R |

FOREIGN PATENT DOCUMENTS

| | | | |
|---|---|---|---|
| 2017228 | 10/1979 | European Pat. Off. | ............ 415/173.1 |
| 2092681 | 8/1982 | European Pat. Off. | ............ 415/173.1 |
| 2155558 | 9/1985 | European Pat. Off. | ............ 415/173.1 |
| 2231426 | 1/1974 | Germany | ............................. 415/173.1 |

*Primary Examiner*—John E. Ryznic
*Attorney, Agent, or Firm*—Andrew C. Hess; Rodney M. Young

[57] ABSTRACT

A gas turbine engine turbine blade squealer tip includes an airfoil tip cap having an airfoil shape and pressure and suction sides joined together at chordally spaced apart leading and trailing edges of the tip cap. The squealer tip further includes a plurality of squealer ribs extend outward from the tip cap between the leading and trailing edges and substantially parallel channels between the squealer ribs. The squealer ribs and channels may have rectangular cross-sections and may also include a trailing edge rib along a portion of the suction side including the trailing edge and/or a leading edge rib curved around an axially extending portion of the leading edge. The squealer ribs are preferably angled in an axially aft direction from the leading edge on the suction side towards the trailing edge on the pressure side. Channel ribs may be disposed between the squealer ribs and across the channels and may be arranged such that only one of the channel ribs is disposed across each of the channels. The squealer tip may be constructed with no apertures through the tip cap in the channels between squealer ribs.

16 Claims, 2 Drawing Sheets

RIBBED TURBINE BLADE TIP

BACKGROUND OF THE INVENTION

1. Field of the Invention

The present invention relates generally to turbine rotor blade tip seals in gas turbine engines and, more specifically, to squealer tips with ribs extending between suction and pressure sides of the blade.

2. Discussion of the Background Art

It is well known that a reduction in gas turbine engine efficiency results from leaking of hot expanding combustion gases in the turbine across a gap between rotating turbine blades and stationary seals or shrouds which surround them. The problem of sealing between such relatively rotating members to avoid loss in efficiency is very difficult in the turbine section of the engine because of high temperatures and transient centrifugal loads.

One well known method of improving the sealing between the turbine blade and shroud is the provision of squealer type tips on turbine blades. A squealer tip includes a continuous peripheral end wall of relatively small height surrounding and projecting outwardly from an end cap on the outer end of a turbine blade which closes a cooling air chamber in the interior of the blade.

During operation of the engine, temperature changes create differential rates of thermal expansion and contraction on the blade rotor and shroud which may result in rubbing between the blade tips and shrouds. Centrifugal forces acting on the blades and structural forces acting on the shrouds create distortions thereon which may also result in rubbing interference. This is particularly true during engine acceleration when then rotor is suddenly accelerated.

Such rubbing interference between the rotating blade tips and surrounding stationary shrouds causes heating of the blade tips resulting in excessive wear or damage to the blade tips and shrouds. It is, therefore, desirable to cool the blade tips. However, in the case of squealer type blade tips, heating produced by such rubbing interference is actually augmented by the presence of a cavity defined by the end cap and peripheral end wall of the squealer tip. Therefore, squealer type blade tips, though fostering improved sealing, actually require additional cooling. Cooling of the squealer tip is conventionally provided by tip cooling holes in the tip cap leading from the cooling air chamber to the cavity.

Because of the complexity and relative high cost of replacing or repairing turbine blades, it is desirable to prolong as much as possible the life of blade tips and respective blades. Blade tip cooling is a conventional practice employed for achieving that objective. The provision of holes for directing air flow to cool blade tips is known in the prior art, for instance as disclosed in U.S. Pat. No. 4,247,254 to Zelahy, and have been applied to squealer type blade tips as disclosed in U.S. Pat. No. 4,540,339 to Horvath.

Turbine engine blade designers and engineers are constantly striving to develop more efficient ways of cooling the tips of the turbine blades to prolong turbine blade life and reduce engine operating cost. However, cooling air used to accomplish this is expensive in terms of overall fuel consumption. Thus, more effective and efficient use of available cooling air in carrying out cooling of turbine blade tips is desirable not only to prolong turbine blade life but also to improve the efficiency of the engine as well, thereby, again lowering engine operating cost. Consequently, there is a continuing need for a squealer tip design that will make more effective and efficient use of available cooling air.

SUMMARY OF THE INVENTION

A gas turbine engine turbine blade squealer tip includes an airfoil tip cap having an airfoil shape and pressure and suction sides joined together at chordally spaced apart leading and trailing edges of the tip cap. The squealer tip further includes a plurality of squealer ribs extend outward from the tip cap between the leading and trailing edges and substantially parallel channels between the squealer ribs. The squealer ribs and channels may have rectangular cross-sections between the pressure and suction sides. The squealer ribs may also include a trailing edge rib along a portion of the suction side including the trailing edge and/or a leading edge rib curved around an axially extending portion of the leading edge. The squealer ribs may be angled in an axially aft direction from the leading edge on the suction side towards the trailing edge on the pressure side.

Channel ribs may be disposed between the squealer ribs and across the channels and may be arranged such that only one of the channel ribs is disposed across each of the channels. The squealer tip may be constructed with no apertures through the tip cap in the channels between squealer ribs. The squealer tip may further include a hollow airfoil portion with a cooling chamber portion therein located inward of the tip cap with respect to the squealer ribs. Internal cooling ribs portions may be disposed within the hollow airfoil and integral with the tip cap.

A more particular embodiment of the invention is a gas turbine engine turbine blade having an airfoil with an airfoil outer wall with pressure and suction sidewalls joined together at chordally spaced apart leading and trailing edges of the airfoil and extending longitudinally from a blade root to the squealer tip. The sidewalls are spaced apart from each other between the leading and trailing edges and joined together by a plurality of internal ribs defining at least one cooling circuit. The squealer tip includes the airfoil tip cap having an airfoil shape with pressure and suction sides coinciding with the pressure and suction sidewalls of the blade. A plurality of squealer ribs extend outward from the tip cap between the leading and trailing edges and substantially parallel channels are between the squealer ribs.

ADVANTAGES OF THE INVENTION

The present invention provides advantages that include a squealer tip that operates significantly cooler than conventional squealer tip designs without the use of expensive cooling air in the squealer tip cavity. Another advantage of the present invention is that it requires minimized film cooling and is easier to cool by conduction to the squealer tip cap. Tip leakage flow along the angled tip rib orientation from the pressure side toward the suction side is small due to the small pressure gradient between the pressure side and the suction side along the rib direction. Tip leakage flow perpendicular to the tip rib orientation is also reduced due to the multiple rib restrictions compare to two restrictions in the conventional squealer tip design. Overall tip leakage flow from pressure side toward suction side is reduced compared to the conventional squealer tip design. The tip ribs can be cast in one piece with the airfoil and service repair for the ribbed tip use similar to conventional squealer tips. The tip ribs also can be cast integral with the tip cap as a single piece article that can be easily brazed to the airfoil.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
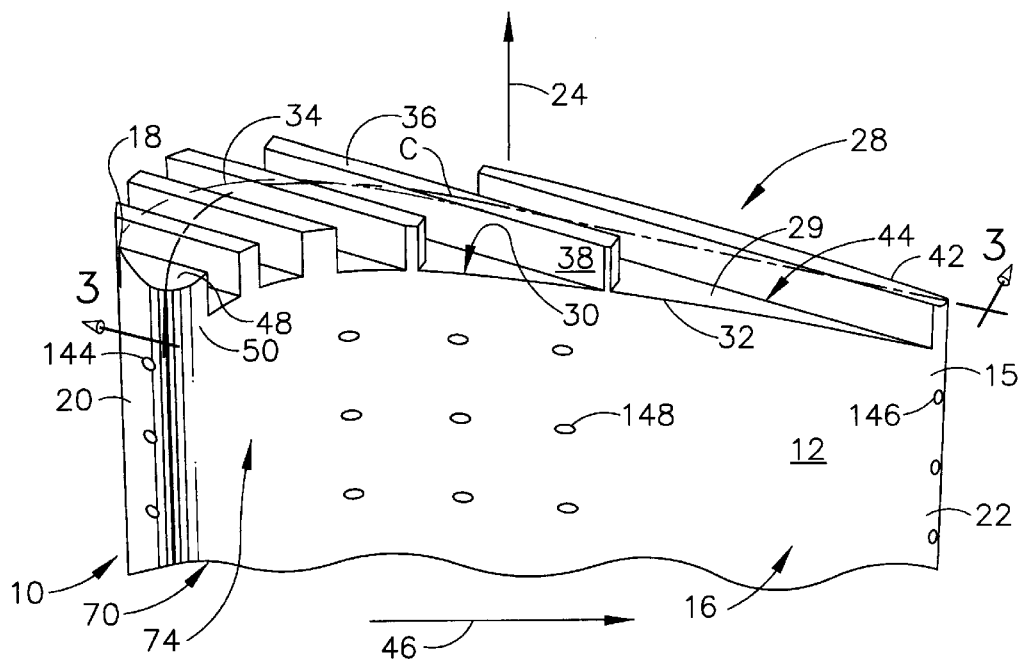
FIG. 1 is a perspective view illustration of an outer portion of a gas turbine engine blade airfoil having a ribbed tip cap in accordance with an exemplary embodiment of the present invention.
Figure 3:
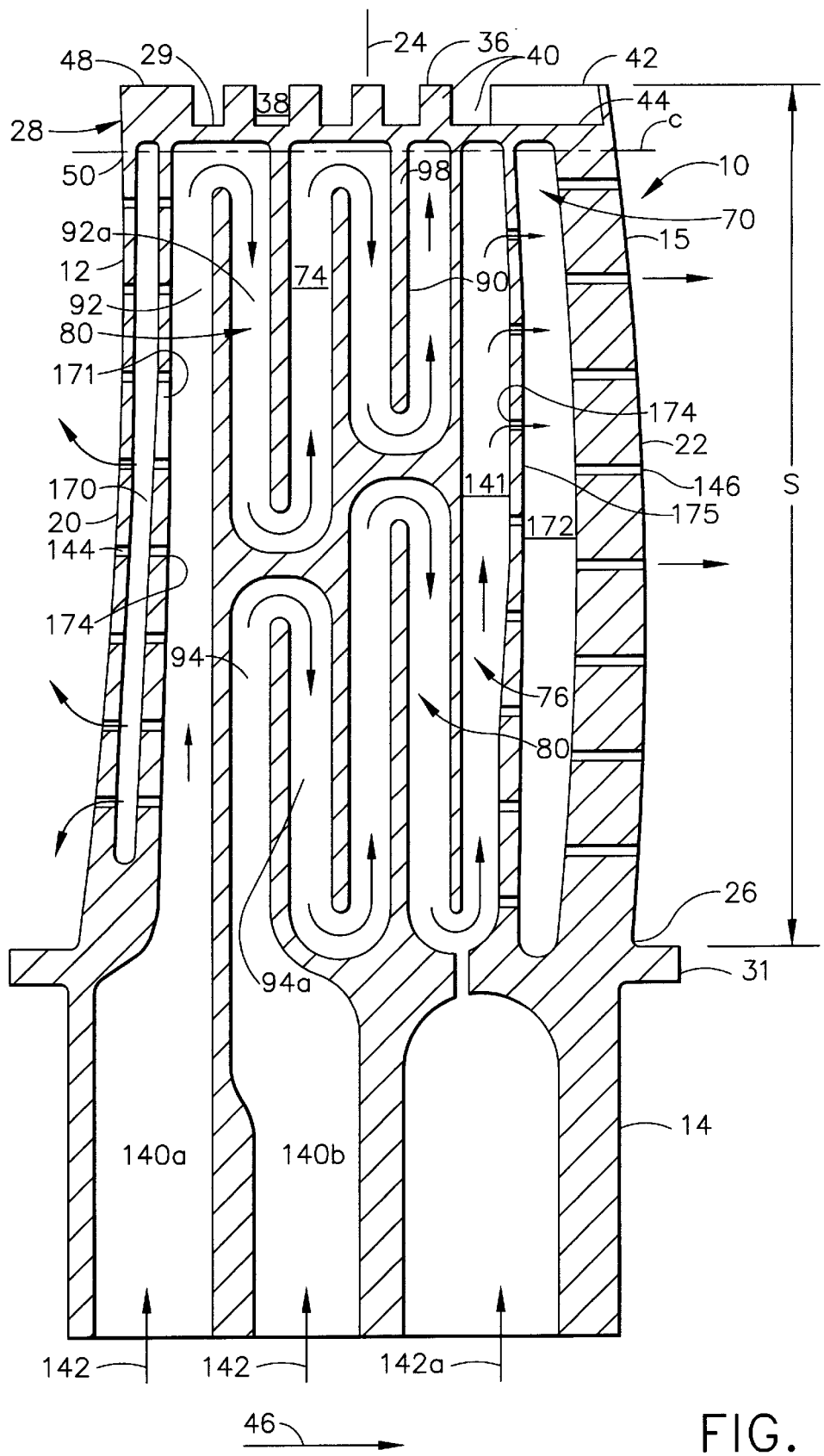
FIG. 3 is a sectional view of the gas turbine engine blade airfoil illustrated in FIG. 1 and taken along line 3—3.

Illustrated in FIGS. 1 and 3 is an exemplary turbine blade 10 for a gas turbine engine. The blade 10 includes an airfoil 12 and a root 14 which is used to conventionally secure the blade 10 to a rotor disk of the engine. The airfoil 12 has an outer wall 15 with a pressure sidewall 16 and a suction sidewall 18 joined together along an upstream leading edge 20 and a downstream trailing edge 22 which is spaced axially or chordally therefrom with respect to a chord C. The airfoil 12 extends longitudinally along a longitudinal or radial axis 24 in a spanwise direction of the airfoil 12 from a radially inner airfoil base 26 to a radially outer squealer tip 28 along a span S of the airfoil.

The squealer tip 28 has an airfoil tip cap 29 with an airfoil shape 30 and pressure and suction sides 32 and 34, respectively, which coincide with pressure and suction sidewalls 16 and 18, respectively, which are joined together at the chordally spaced apart leading and trailing edges 20 and 22, respectively, of the tip cap. A plurality of squealer ribs 36 extend outward from the tip cap 29 between the leading and trailing edges 20 and 22, respectively, and substantially parallel channels 38 are disposed between the squealer ribs.

The squealer ribs 36 and channels 38 preferably have rectangular cross-sections 40 between the pressure and suction sides 32 and 34, respectively. The squealer ribs 36 preferably include a trailing edge rib 42 along a portion 44 of the suction side 34 including the trailing edge 22. Additionally or alternatively, the squealer ribs 36 also preferably include a leading edge rib 48 curved around at least an axially extending portion 50 of the leading edge 20. The squealer ribs 36 are preferably angled in an axially aft direction 46 from the leading edge 20 on the suction side 34 towards the trailing edge 22 on the pressure side 32. During the engine's operation, a surface static pressure distribution with higher pressures on the pressure side 32 than the suction side 34 at the same axial location and decreasing pressures from the leading edge 20 toward the trailing edge 22 exists along the airfoil 12. Any tip leakage flow from pressure side 32 toward suction side 34 will be guided through the channels 38 along the squealer ribs 36 with an orientation as described above. The pressure gradient along the squealer ribs 36 and through the channels 38 is minimized due to the characteristics in the pressure distribution as described above. This provides a reduction in tip leakage flows.

Figure 2:
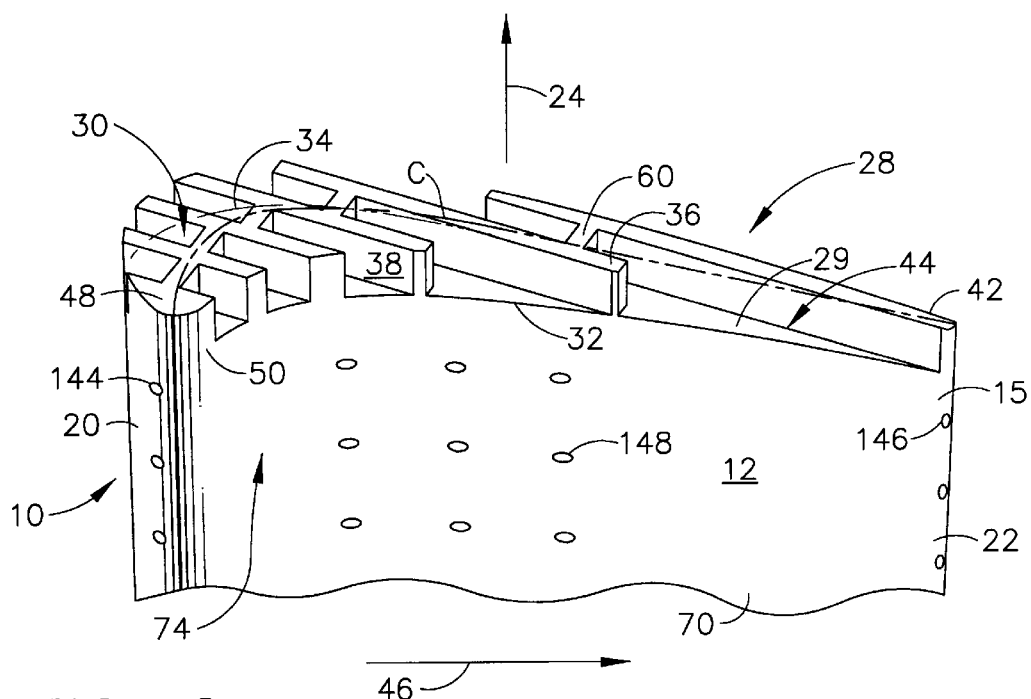
FIG. 2 is a perspective view illustration of an outer portion of a gas turbine engine blade airfoil having a ribbed tip cap in accordance with an alternative embodiment of the present invention.

FIG. 2 illustrates an alternative configuration of the squealer tip 28 having channel ribs 60 disposed across the channels 38 between and perpendicular to the squealer ribs 36. The squealer tip 28 preferably has an array of the channel ribs 60 such that only one of the channel ribs is disposed across each of the channels 38 though more than one channel rib may be disposed each of the channels. The squealer tip may be constructed with no apertures through the tip cap 29 in the channels 38 between squealer ribs 36 to save cooling air. The channel ribs are designed to further block the tip leakage flow from the pressure side 32 to the suction side 34 and are preferably located in the middle of the tip cap such as along the chord C to also provide an effective means for conduction cooling through tip cap 29.

The airfoil base 26 is defined at a conventional platform 31 which forms the inner flow boundary of the airfoil 12 and below which extends the root 14. During operation of the blade 10, combustion gases are generated by a combustor (not shown) and flow downstream over both airfoil sidewalls 16 and 18. Cooling of the airfoil 12 is provided by the hollow airfoil 12 of which a portion 70 of the hollow airfoil with a cooling chamber portion 74 therein is located inward of the tip cap 29 with respect to the squealer ribs 36.

Illustrated in FIG. 3 is a more specific embodiment of the invention wherein a cooling chamber 76 in the hollow airfoil 12 includes at least one cooling circuit 80 as may be conventionally found in the art such as in U.S. Pat. Nos. 5,660,524, 5,591,007, and U.S. patent application Ser. No. (GE ATTORNEY DOCKET NO. 13DV-12590). The pressure and suction sidewalls 16, 18 are spaced circumferentially or laterally apart from each other between the leading and trailing edges 20, 22 and are integrally joined together by a plurality of internal ribs 90 which define at least independent cooling passages denoted as outer and inner cooling circuits 92 and 94 a-having outer and inner tier serpentine portions 92a and 94a, respectively.

The internal cooling ribs 90 include internal cooling rib portions 98 disposed within the hollow airfoil 12 and integral with the tip cap 29. This further helps to cool the tip cap 29 and the squealer and channel ribs 36 and 60, respectively, by conduction and convection. Inner and outer inlet channels 140b and 140a respectively commence at a common plane below the airfoil base 26 inside the root 14 for conventionally receiving cooling air 142. The cooling air 142 is therefore used more efficiently and less cooling air is bled from the compressor for increasing the overall efficiency of operation of the gas turbine engine.

A leading edge cooling plenum 170 is formed between a forward most span rib 171 and the leading edge 20 of the outer wall 15. A trailing edge cooling plenum 172 is formed between an aftward most span rib 175 and the trailing edge 22 of the outer wall 15. Cooling air discharge apertures 174 in the forward most span rib 171 feeds cooling air from the outer inlet channel 140a to the leading edge cooling plenum 170 from where it is flowed through conventional leading edge shower head cooling holes 144. Cooling air discharge apertures 174 in the aftward most span rib 175 feeds cooling air from an inner outlet channel 141 to the trailing edge cooling plenum 172 from where it is flowed through conventional trailing edge cooling holes 146. This is used to cool the leading and trailing edges 20 and 22, respectively.

The airfoil may include a plurality of downstream angled film cooling holes 148 along one or both sides of the outer wall 15 between the leading and trailing edges. The airfoil 12 may have any other conventional features for enhancing the cooling thereof, such as, turbulators or pins (not shown) which are well known in the art.

While there have been described herein what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A gas turbine engine turbine blade squealer tip comprising:

an airfoil tip cap having an airfoil shape, said tip cap including pressure and suction sides joined together at chordally spaced apart leading and trailing edges of said tip cap, a plurality of squealer ribs extending outward from said tip cap between said leading and trailing edges, substantially parallel channels between said squealer ribs, and a trailing edge rib extending outward from said tip cap and along a portion of said suction side including said trailing edge.

2. A squealer tip as claimed in claim 1 further including a leading edge rib extending outward from said tip cap and curved around at least an axially extending portion of said leading edge.

3. A gas turbine engine turbine blade squealer tip comprising:

an airfoil tip cap having an airfoil shape, said tip cap including pressure and suction sides joined together at chordally spaced apart leading and trailing edges of said tip cap, a plurality of squealer ribs extending outward from said tip cap between said leading and trailing edges, substantially parallel channels between said squealer ribs, and ribs disposed between said squealer ribs and across said channels.

4. A squealer tip as claimed in claim 3 wherein only one of said channel ribs is disposed across each of said channels.

5. A squealer tip as claimed in claim 3 further comprising no apertures through said tip cap in said channels between squealer ribs.

6. A squealer tip as claimed in claim 3 further comprising a hollow airfoil portion with a cooling chamber portion therein located inward of said tip cap with respect to said squealer ribs.

7. A squealer tip as claimed in claim 6 further comprising internal cooling ribs portions within said hollow airfoil and integral with said tip cap.

8. A gas turbine engine turbine blade comprising:

an airfoil having an airfoil outer wall with pressure and suction sidewalls joined together at chordally spaced apart leading and trailing edges of said airfoil and extending longitudinally from a blade root to a squealer tip;

said sidewalls being spaced apart from each other between said leading and trailing edges and joined together by a plurality of internal ribs defining at least one cooling circuit;

said squealer tip includes an airfoil tip cap having an airfoil share with pressure and suction sides coinciding with said pressure and suction sidewalls and a plurality of squealer ribs extending outward from said tip cap between said leading and trailing edges;

substantially parallel channels between said squealer ribs;

a trailing edge rib along a portion of said suction side including said trailing edge; and a leading edge rib curved around at least an axially extending portion of said leading edge.

9. A blade as claimed in claim 8 wherein said squealer ribs are angled in an axially aft direction from said leading edge on said suction side towards said trailing edge on said pressure side.

10. A gas turbine engine turbine blade comprising:

an airfoil having an airfoil outer wall with pressure and suction sidewalls joined together at chordally spaced apart leading and trailing edges of said airfoil and extending longitudinally from a blade root to a squealer tip;

said sidewalls being spaced apart from each other between said leading and trailing edges and joined together by a plurality of internal ribs defining at least one cooling circuit;

said squealer tip includes an airfoil tip cap having an airfoil shape with pressure and suction sides coinciding with said pressure and suction sidewalls and a plurality of squealer ribs extending outward from said tip cap between said leading and trailing edges;

substantially parallel channels between said squealer ribs;

a trailing edge rib along a portion of said suction side including said trailing edge;

a leading edge rib curved around at least an axially extending portion of said leading edge;

said squealer ribs are angled in an axially aft direction from said leading edge on said suction side towards said trailing edge on said pressure side; and said squealer ribs and channels have rectangular cross-sections between said pressure and suction sides.

11. A blade as claimed in claim 10 further comprising no apertures through said tip cap in said channels between squealer ribs.

12. A blade as claimed in claim 11 further comprising channel ribs disposed between said squealer ribs and across said channels.

13. A blade as claimed in claim 12 wherein only one of said channel ribs is disposed across each of said channels.

14. A gas turbine engine turbine blade comprising:

an airfoil having an airfoil outer wall with pressure and suction sidewalls joined together at chordally spaced apart leading and trailing edges of said airfoil and extending longitudinally from a blade root to a squealer tip;

said sidewalls being spaced apart from each other between said leading and trailing edges and joined together by a plurality of internal ribs defining at least one cooling circuit;

said squealer tip includes an airfoil tip cap having an airfoil shape with pressure and suction sides coinciding with said pressure and suction sidewalls and a plurality of squealer ribs extending outward from said tip cap between said leading and trailing edges;

substantially parallel channels between said squealer ribs; and channel ribs disposed between said squealer ribs and across said channels.

15. A blade as claimed in claim 14 wherein only one of said channel ribs is disposed across each of said channels.

16. A blade as claimed in claim 15 further comprising a trailing edge rib along a portion of said suction side including said trailing edge and a leading edge rib curved around at least an axially extending portion of said leading edge.

* * * * *